Patented Mar. 3, 1942

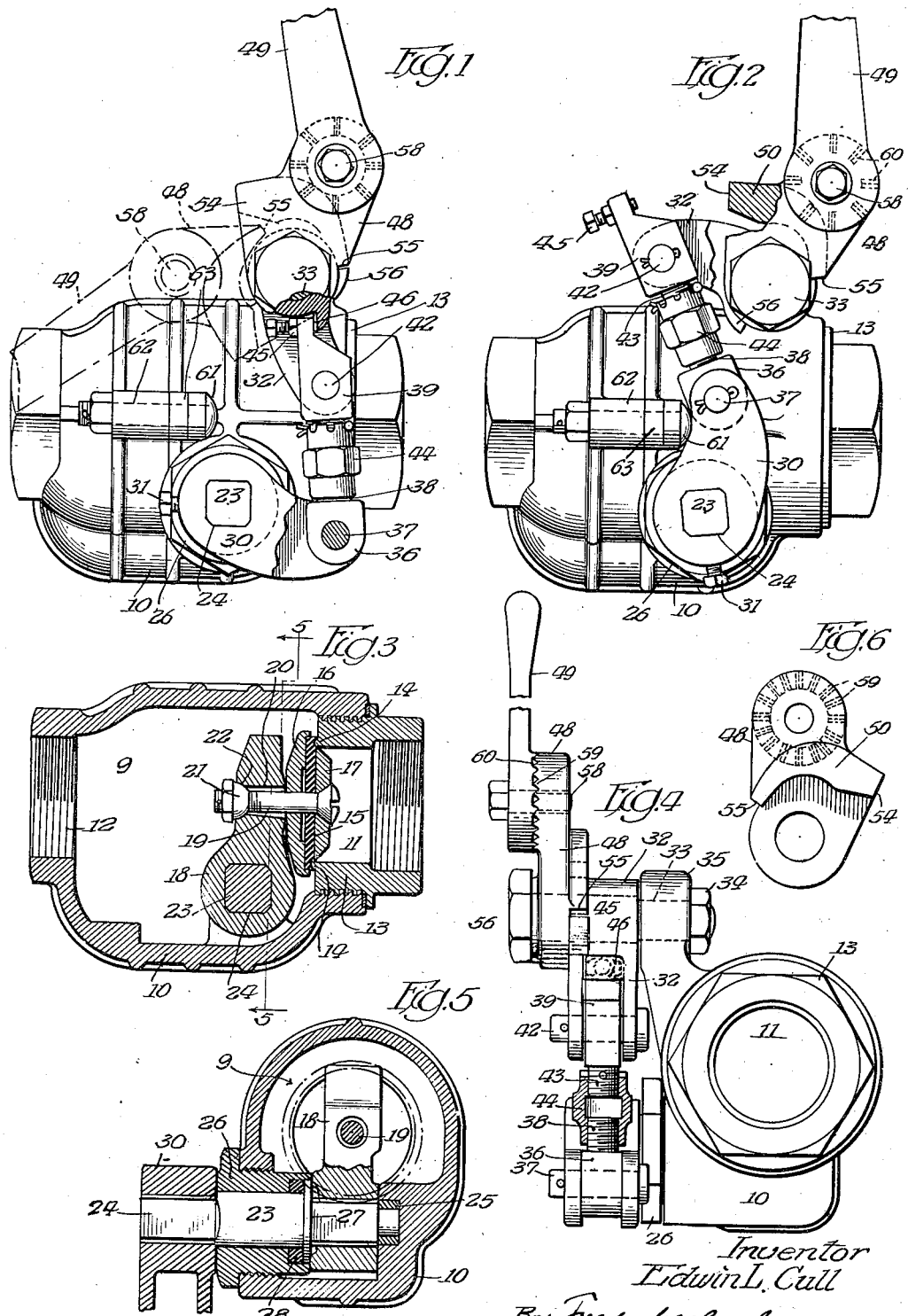

2,274,776

UNITED STATES PATENT OFFICE 2,274,776

QUICK-OPENING VALVE

Edwin L. Cull, Chicago, Ill., assignor to The Okadee Company, Chicago, Ill., a corporation of Illinois Application January 21, 1941, Serial No. 375,122

10 Claims. (Cl. 251—10)

The invention relates to valves and more particularly to quick-opening valves which are adapted to be opened and closed by a manually operable lever.

In valves, such for example, as those used in fire prevention systems in which liquid carbondioxide is stored in a tank at pressure as high as 325 pounds per inch, it is desired to manually and quickly open the valve for full and unrestricted flow to the nozzles or outlets for distributing the carbondioxide for fire extinction or prevention. It is also necessary to maintain a gas-tight closure between the valve-seat and closure member so that gas from the tank will not escape and deplete the supply of carbondioxide before occasion arises for its use. In this type of valve, a lever of considerable length to enable the user to close the valve against the fluid under pressure and to force the closure-member against its seat to prevent leakage, is required. The pressure from the inlet line, as soon as the valve leaves its seat in opening, exerts a high pressure against the valve-member which produces a severe shock on the lever which will be transmitted to the operator while grasping the lever-handle if the lever is movable with the closure member. Such quick movement of the lever may result in injury to the operator.

One object of the invention is to provide a valve of this type in which the closure-member will be securely locked in is closed position, can be quickly opened to provide for a straight or unrestricted flow through the valve-casing and which can be easily operated while the closure-member is subjected to high pressure.

Another object of the invention is to provide a lever-operated valve of this type, in which provision is made for preventing the lever from injuring the operator when the closure-member is quickly shifted by fluid under high pressure.

Another object of the invention is to provide a valve of this type which is efficient in operation and can be easily operated.

Other objects of the invention will appear from the detailed description.

The invention consists in the several novel features which are hereinafter set forth and are more particularly defined by claims at the conclusion hereof.

In the drawing: Fig. 1 is a side elevation of a valve embodying the invention, the shifting mechanism being shown in position assumed when the valve is closed, and a portion of the lever being broken away. Fig. 2 is a similar view, parts being shown in section, illustrating the shifting mechanism in position assumed when the valve is open. Fig. 3 is a central horizontal section through the valve. Fig. 4 is an end elevation, the nut of the link being shown in section. Fig. 5 is a section taken on line 5—5 of Fig. 3. Fig. 6 is a detail of the hub-section of the operating lever.

The invention is exemplified in a valve comprising a casing 10 provided with an aligned inlet opening 11 in one end and an outlet opening 12 in the other end. Said openings are axially aligned for the direct flow of fluid through the casing. The inlet opening 11 is formed in a bushing 13 which is screw-threaded into the casing. The inner end of the bushing has an annular rib 14 which forms a valve-seat. The closure-member consists of a disk 15 of flexible material, such as suitable rubber, and is adapted to be pressed against the seat 14 to form a bubble-tight closure. Disk 15 is confined between heads 16 and 17. A stem 19 extends through heads 16 and 17 and is connected to an arm 18 in the valve casing. Stem 19 extends through an opening 20 in arm 18 and a spherically convex nut 21 is screw-threaded to the inner end of said stem. The spherical portion of nut 21 fits in a spherical seat 22 on the inner side of arm 18 and stem 19 extends loosely through opening 20 in the arm to permit the face of disk 15 to align itself with the valve-seat 14. Disc 17 has a bevelled edge for guiding it into opening 11 and guiding the disk 15 to its seat 14. The face of arm 18 where it engages disk 16 is slightly conical to permit a slight transverse movement of said disk for centering the closure with respect to seat 14. A shaft 23 extends through the arm 18, is journaled in the valve-casing, and has a polygonal portion 24 which extends through the hub of arm 18. Shaft 23 is adapted to swing arm 18 to open and close the valve. This exemplifies a valve in which the closure-member is subjected to fluid under high pressure from the inlet side of the casing and is pivoted so that when the closure is unlocked the pressure exerted against the closure will quickly swing the arm 18 and the closure to one side of the chamber 9 in the valve-casing and permit substantially free and direct flow of the fluid through the casing. The reduced inner end of shaft 23 is journaled in a bushing 25 and the outer portion is journaled in a bushing 26 which is screw-threaded into the casing. Shaft 23 is formed with a flange 27 which engages a packing-ring 28 to form a seal between the shaft and casing.

The mechanism for shifting the disk 15 to and from its seat 14 and holding it closed comprises a forked arm 30, the hub of which has a polygonal bore fitting around the polygonal outer end portion 24 of shaft 23 so that the shaft can be rocked by the arm. A set-screw 31 detachably secures arm 30 to shaft 23. This mechanism also comprises a second forked arm 32 which is pivotally mounted on a stud 33 which is fixedly held by a nut 34 in an upwardly projecting lug 35 which is integrally formed with the casing 10. A toggle-link connects, and is confined in, the forked ends of arms 30 and 32. This link comprises a member 36 which is pivoted on a pin 37 held in the forked end of arm 30 and provided with an integral screw-threaded stem 38; a member 39 which is confined in the forked outer end of arm 32, pivoted to a pin 42 carried by said arm, and is provided with a screw-threaded stem 43; and a nut 44 connected to stems 39, 43 by right and left-hand threads to provide for the adjustment of the length of the toggle-link. Member 39 is provided with a set-screw 45 which forms an adjustable abutment for engaging an abutment 46 on arm 32 to limit the relative movement of the link and arm 32 across their dead-center when the disk 15 is engaged with its seat 14 to close the valve, and to lock the link, arm 30 and arm 32 in position to hold the disk engaged with the seat by the pressure of fluid against the closure.

A lever is provided for rocking arm 32 to shift the link-connection with arm 30. Said lever comprises a hub-section 48 which is fulcrumed on stud 33 to swing independently of arm 32 and a handle-section 49 which is adjustably connected to section 48. A lug 50 is integral with, and projects from the inner face of hub-section 48 for shifting arm 32. This lug is shaped to form an abutment 54 for engaging one edge of, and shifting arm 32 for closing the valve and an abutment 55 for engaging an abutment 56 integrally formed with arm 32, for shifting said arm to open the valve. These abutments on the lever 48 and arm 32 are arranged to permit independent movement of arm 32 in one direction relatively to the lever so that the sudden shift of arm 32 caused by the high pressure against the valve-closure which is transmitted from arm 30 through the link to arm 32 will impart no shock to the lever when the lever is shifted to open the valve. Such shift by the fluid under pressure will cause abutment 56 on arm 32 to move away from abutment 55 independently of the lever.

Hub-section 48 and handle-section 49 of the lever are secured together by a screw 58 which is threaded to section 48 and is adapted to clamp the lever-sections together. The hub-section 48 is provided with V-shaped notches 59 adapted to receive V-shaped ribs 60 formed on the abutting faces of the sections, respectively, for adjustably locking the handle-section to the hub-section. In practice, the handle-section must be of considerable length to enable the operator to manually shift the valve-shifting mechanism and, by providing for an adjustment between the lever-sections, the handle section may be pivotally adjusted so that its position may be varied according to the space available for its necessary range of movement in opening and closing the valve.

The movement of arm 30 in opening the valve is arrested by the head of a cushioned stop 61 which is slidably mounted in an ear 62 integrally formed with the casing 10. Rings of rubber 63 are interposed between the head of bolt 61 and ear 62 to absorb the shock from arm 30 when the valve is suddenly shifted by the fluid under pressure during the opening of the valve.

The operation of the valve-shifting mechanism will be as follows: when the valve is closed, as illustrated in Figs. 1 and 3, arm 32 and its link connection with arm 30 will be slightly across the dead-center of the link and arm 32 and arrested against further movement across the dead-center by the engagement of stop-screw 45 and abutment 46. The pressure of fluid against the valve-closure will be applied to move arm 30 upwardly and force the link and arm 32 into position where they will be locked against further movement by the stop-screw 45 and abutment 46. The resiliency of closure-disk 15 permits the link and arm 32 to cross the dead-center slightly when closing the valve. Normally, the lever will be in its lowered position, as illustrated by dotted lines in Fig. 1, and its abutments 54 and 55 will be disengaged from the arm 32. To open the valve, the lever will be swung to the right and fulcrum on stud 33 until abutment 55 on the hub-section 48 of the lever engages abutment 56 on arm 32. A slight further movement of the lever with abutments 55 and 56 engaged will rock arm 32 and shift the link across its dead-center and unlock the link and arm 32. Abutment screw 45 will be free to move away from abutment 46 on lever-section 48. When the link and arm have crossed their dead-center the valve-closure will be unlocked and the pressure of fluid applied to the closure will quickly shift the closure, arms 20, 30, the link and arm 32 until arm 32 is arrested by the cushioned stop 61. The arms 30, the link and arm 32 will then be shifted into the position illustrated in Fig. 2. During this quick movement of the parts in opening the valve, the abutment 56 on arm 32 will move away from abutment 55 on lever-section 48, and abutment 54 will not interfere with the independent movement of arm 32. As a result, no shock will be imparted to the operator through the lever during the quick opening of the valve by the high pressure fluid passing through the valve-casing. When the valve is to be closed the operator will swing the lever to the left to cause abutment 55 on lever-section 48 to engage arm 32 and swing the arm so it will operate the link and arm 30 until arm 32 and the link are slightly across the dead-center and they are locked against further movement by the engagement of stop 45 on the link and abutment 46 on arm 32. The valve-disk 15 will then be compressed to form a tight-closure against the seat 14. The pressure of fluid against the valve-closure will be applied to hold locked the link and arm 32 through the screw 45 and abutment 46 on arm 32.

When the disk 17 is in its open position there is very little pressure against the disk 17 and consequently it requires only a small amount of leverage during the initial part of its closing stroke and, as the disk continues its closing movement, the pressure of the fluid progressively increases. Therefore, it is desirable to have the leverage progressively increase with substantially equal force from the lever 49. A characteristic of the operation of the valve shifting mechanism is that arms 30 and 32 are pivoted for relative pivotal movement so that the leverage progressively increases during the closing movement of the valve in substantially the same proportion as the force of the fluid against disk 15 increases as said disk moves to its closed position, from a substantially uniform force applied to lever 49 in closing the valve.

The invention exemplifies a quick-opening valve and manually operable opening and closing mechanism by which the valve-closure will be securely pressed against its seat, as the result of the pressure of the fluid applied to it through its action upon the toggle device. It also exemplifies manually operable valve opening and closing mechanism for a quick-opening valve in which the shock resulting from the action of the fluid under pressure on the valve-closure will not be imparted to the handle. It also exemplifies a quick-opening valve which is efficient in operation.

The invention is not to be understood as restricted to the details set forth, since these may be modified within the scope of the appended claims, without departing from the spirit and scope of the invention.

Having thus described the invention, what I claim as new and desire to secure by Letters Patent is:

1. The combination with a valve comprising a casing provided with an inlet, an outlet and an internal seat, and a closure pivoted to swing away from the seat by the pressure of liquid from the inlet and housed in the casing between the inlet and the outlet and adapted to engage the internal seat, of an arm pivotally supported by and disposed at one side and on the outside of the casing and coupled to, and for shifting the closure, a second arm supported on and disposed at one side and on the outside of the casing, a link pivoted to, and extending between said arms, said link and second arm being arranged to swing slightly across their dead center when the closure is against the seat, abutments on the link and the second arm for limiting their movement in one direction and locking the closure on the seat, and a lever supported on the outside of the casing for shifting said second arm and tripping said link to release the closure and permitting it to be opened by the pressure of fluid from the inlet.

2. The combination with a valve comprising a casing provided with an inlet, an outlet and an internal seat, and a closure pivoted to swing away from the seat by the pressure of liquid from the inlet and housed in the casing between the inlet and the outlet and adapted to engage the internal seat, of an arm pivotally supported by and disposed at one side and on the outside of the casing and coupled to, and for shifting the closure, a second arm supported on and disposed at one side and on the outside of the casing, a link pivoted to, and extending between said arms, said link and second arm being arranged to swing slightly across their dead center when the closure is against the seat, abutments on the link and the second arm for limiting their movement in one direction and locking the closure on the seat, one of said abutments being adjustable, and a lever supported on the outside of the casing for shifting said second arm and tripping said link to release the closure and permitting it to be opened by the pressure of fluid from the inlet.

3. In combination with a valve comprising a casing provided with an inlet, an outlet and an internal seat, and a closure pivoted to swing away from the seat by the pressure of liquid from the inlet and housed in the casing between the inlet and the outlet and adapted to engage the internal seat, of an arm pivotally supported by and disposed at one side and on the outside of the casing and coupled to, and for shifting the closure, a second arm supported on and disposed at one side and on the outside of the casing, a link comprising members pivoted to said arms, respectively, and an adjustable nut threaded to said members for varying the length of the link, abutments on the link and second arm arranged to permit said link and second arm to swing slightly across their dead-center when the closure is against the abutments on the link and the second arm for limiting their movement in one direction and locking the closure on the seat, and a lever supported on the outside of the casing for shifting said second arm and tripping said link to release the closure and permitting it to be opened by the pressure of fluid from the inlet.

4. The combination with a valve comprising a casing provided with an inlet, an outlet and an internal seat, and a closure pivoted to swing away from the seat by the pressure of liquid from the inlet and housed in the casing between the inlet and the outlet and adapted to engage the internal seat, of an arm pivotally supported by and disposed at one side and on the outside of the casing and coupled to, and for shifting the closure, a second arm supported on and disposed at one side and on the outside of the casing, a link pivoted to and extending between said arms, said link and second arm being arranged to swing slightly across their dead center when the closure is against the seat, abutments on the link and the second arm for limiting their movement in one direction and locking the closure on the seat, and a lever supported on the outside of the casing pivoted to swing concentrically with and for shifting said second arm and tripping said link to release the closure and permitting it to be opened by the pressure of fluid from the inlet.

5. The combination with a valve comprising a casing provided with an inlet, an outlet and a seat, and a closure pivoted to swing away from the seat by the pressure of liquid from the inlet, of an arm pivotally supported by the casing and coupled to, and for shifting the closure, a second arm supported on the casing, a link pivoted to, and extending between said arms, said link and second arm being arranged to swing slightly across their dead-center when the closure is seated, abutments on the link and the second arm for limiting their movement away from their dead-center when the closure is on the seat, a lever on the casing for shifting said second arm for tripping said link to release the closure and permitting it to be opened by the pressure of fluid from the inlet, said lever being pivoted to swing relatively to said second arm, and abutments between the second arm and lever arranged to permit independent movement of the second arm when the closure is quickly opened by fluid under pressure for preventing the transmittal of shock to the lever.

6. The combination with a valve comprising a casing provided with an inlet, an outlet and a seat, and a closure pivoted to swing away from the seat by the pressure of liquid from the inlet, of an arm pivotally supported by the casing and coupled to, and for shifting the closure, a second arm supported on the casing, a link pivoted to, and extending between said arms, said link and second arm being arranged to swing slightly across their dead-center when the closure is seated, abutments on the link and the second arm for limiting their movement away from their dead-center when the closure is on the seat, a lever on the casing for shifting said second arm for tripping said link to release the closure and permitting it to be opened by the pressure of fluid from the inlet, said lever being pivoted to swing concentrically with, and relatively to, the second arm, and abutments between the second arm and lever arranged to permit independent movement of the second arm when the closure is quickly opened by fluid under pressure for preventing the transmittal of shock to the lever.

7. The combination with a valve comprising a casing provided with an inlet, an outlet and a seat, and a closure pivoted to swing away from the seat by the pressure of liquid from the inlet, of an arm pivotally supported by the casing and coupled to, and for shifting the closure, a second arm supported on the casing, a link pivoted to, and extending between said arms, said link and second arm being arranged to swing slightly across their dead-center when the closure is seated, abutments on the link and the second arm for limiting their movement away from their dead-center when the closure is on the seat, a lever for shifting said second arm for tripping said link to release the closure and permitting it to be opened by the pressure of fluid from the inlet, said lever being pivoted on the casing relatively to the second arm, abutments between the second arm and lever arranged to permit independent movement of the second arm when the closure is quickly opened by fluid under pressure for preventing the transmittal of shock to the lever, and a cushioned stop for the arm coupled to the closure.

8. The combination with a valve comprising a casing provided with an inlet, an outlet and a seat, and a closure pivoted to swing away from the seat by the pressure of liquid from the inlet, of an arm pivotally supported by the casing and coupled to, and for shifting the closure, a second arm supported on the casing, a link pivoted to, and extending between said arms, said link and second arm being arranged to swing slightly across their dead-center when the closure is against the seat, abutments on the link and the second arm for limiting their movement away from their dead-center when the closure is on the seat, and a lever for shifting said second arm for tripping said link to release the closure and permitting it to be opened by the pressure of fluid from the inlet, said lever comprising a hub-section pivoted concentrically with the second arm, a handle-section pivoted to the hub-section, and means for locking the lever-section to the hub-section.

9. The combination with a valve comprising a casing provided with an inlet, an outlet and a seat, and a closure pivoted to swing away from the seat by the pressure of liquid from the inlet, of an arm pivotally supported by the casing and coupled to, and for shifting the closure, a second arm supported on the casing, a link pivoted to, and extending between said arms, said link and second arm being arranged to swing slightly across their dead-center when the closure is seated, abutments on the link and the second arm for limiting their movement away from their dead-center when the closure is on the seat, a lever on the casing for shifting said second arm for tripping said link to release the closure and permitting it to be opened by the pressure of fluid from the inlet, said lever being pivoted to swing concentrically with, and relatively to, the second arm, abutments between the second arm and lever arranged to permit independent movement of the second arm when the closure is quickly opened by fluid under pressure for preventing the transmittal of shock to the lever, and abutments between the second arm and the hub-section arranged to permit independent movement of the second arm when the closure is quickly shifted by fluid under pressure in opening the valve.

10. The combination with a valve comprising a casing provided with an inlet, an outlet, and an internal seat, and a closure pivoted to swing away from the seat by the pressure of liquid from the inlet and housed in the casing between the inlet and the outlet and adapted to engage the internal seat, of an arm pivotally supported by and disposed at one side and on the outside of the casing and coupled to and for shifting the closure, a second arm supported on and disposed at one side and on the outside of the casing, a link pivoted to and extending between said arms and adapted to lock the closure on its seat, said arms being relatively positioned to swing so that the leverage will be progressively increased as the closure is moved from its open position to its seat, and a lever supported on the outside of the casing for shifting said second arm and link to release the closure and permit it to be opened by the pressure of fluid from the inlet.

EDWIN L. CULL.